United States Patent
Tolinski et al.

(12) 
(10) Patent No.: US 6,406,090 B1
(45) Date of Patent: Jun. 18, 2002

(54) SELF-POWERED SOLAR SUNROOF

(75) Inventors: Roch J. Tolinski, Howell; Douglas R. Hare, Rochester Hills, both of MI (US)

(73) Assignee: Meritor Light Vehicle Systems, Inc., Troy, MI (US)

(*) Notice: Subject to any disclaimer, the term of this patent is extended or adjusted under 35 U.S.C. 154(b) by 0 days.

(21) Appl. No.: 09/399,550

(22) Filed: Sep. 20, 1999

(51) Int. Cl.[7] .............................. B60J 7/057; H02N 6/00
(52) U.S. Cl. ...................................... 296/223; 136/243
(58) Field of Search .......................... 296/223; 136/243

(56) References Cited

U.S. PATENT DOCUMENTS

| | | | | |
|---|---|---|---|---|
| 4,800,803 A | * | 1/1989 | Farmont | 98/2.14 |
| 5,008,062 A | * | 4/1991 | Anderson et al. | 264/272.15 |
| 5,156,568 A | * | 10/1992 | Ricci | 454/129 |
| 5,176,758 A | * | 1/1993 | Nath et al. | 136/251 |
| 5,479,557 A | * | 12/1995 | Ganz et al. | 388/829 |
| 5,489,555 A | * | 2/1996 | Yamazaki | 437/226 |
| 5,644,207 A | * | 7/1997 | Lew et al. | 320/5 |

OTHER PUBLICATIONS

Co-owned pending application entitled: Sunshine Roof Panel for a Vehicle, Malcherczyk, filed Sep. 9, 1998, serial No. 09/150,475.

* cited by examiner

*Primary Examiner*—Stephen T. Gordon
*Assistant Examiner*—Greg Blankenship
(74) *Attorney, Agent, or Firm*—Carlson, Gaskey & Olds

(57) ABSTRACT

A self-powered sunroof assembly can be mounted in the roof of a vehicle and includes a movable panel, preferably a window, a motor for controlling movement of the movable panel, and a self-contained power supply unit that supplies power to the motor. The self-contained power supply unit contains a battery and at least one solar cell array that charges the battery. The solar cell array is preferably attached to the movable panel but may be located anywhere on the sunroof assembly that may be directly or indirectly exposed to sunlight. Additionally, placement of the solar cell array on the movable window does not decrease visibility through the window.

26 Claims, 1 Drawing Sheet

SELF-POWERED SOLAR SUNROOF

BACKGROUND OF THE INVENTION

This invention generally relates to a self-powered solar sunroof assembly mounted in the roof of a vehicle. No external attachments are needed to power the sunroof assembly.

Typically, automotive part suppliers supply sunroofs to automotive manufacturers. Prior to this invention, automotive manufacturers had to design the power supply for vehicle sunroofs.

Therefore, much coordination between the suppliers and manufacturers was required to design an appropriate power supply for a given sunroof system. This resulted in increased costs and time delays for both the supplier and the manufacturer.

One item that needs to be coordinated between the manufacturer and supplier is the wiring, which is necessary to facilitate powering movement of the sunroof. The supplier needs to communicate the required parameters to the manufacturers. This means more design time is needed because the supplier's designers and engineers are most familiar with the sunroof system. The manufacturer's designers and engineers then need to educate themselves about the sunroof system to incorporate the sunroof system into the vehicle.

Additionally, the power source for the sunroof is the vehicle's battery. This is potentially problematic due to the development of electric and hybrid electric vehicles. Any additional load on the vehicle's battery in these types of vehicles could be detrimental to the vehicle's overall performance.

Several years ago a solar sunroof system was developed. The glass panel of this prior solar-sunroof was completely covered with solar cells to produce the required power and did not incorporate an auxiliary battery to power the unit. The panel was composed of a transparent electrode positioned between a glass substrate and an electrode containing the amorphous silicon deposits with a dot-matrix pattern stamped out. The solar cells were used to generate electricity that recharged the vehicle's main battery and also powered an auxiliary cooling fan. Thus, wires were still needed to connect the vehicle battery to the sunroof. This solar sunroof system was unsuccessful due to its high price and unaesthetic appearance.

As a result, a completely self-contained, self-powered solar sunroof assembly that requires minimal coordination between automotive manufacturer and supplier and minimal reliance on the vehicle's systems would be advantageous for both parties.

SUMMARY OF THE INVENTION

The self-powered solar sunroof of the present invention overcomes the above problems with known solar powered sunroof systems. In general terms, this invention is a self-powered solar sunroof assembly. The unit is completely self-contained, meaning that the sunroof functions independently of the vehicle's systems. In fact, the unit can even function when completely removed from a vehicle.

The sunroof assembly comprises a movable panel, preferably a window, mounted in a vehicle's roof, a motor for controlling movement of the movable panel, and a self-contained power supply unit that supplies power to the motor. The self-contained power supply unit includes an auxiliary battery, separate from the vehicle battery, and at least one solar cell array that charges the battery. The solar cell array or arrays are attached to the movable panel or any part of the sunroof assembly that may be directly or indirectly exposed to the sun. This invention can be used in spoiler sunroofs, slide-tilt sunroofs, or other types of sunroofs.

Additionally, this invention not only can be utilized in current vehicles; it can also be utilized in specialty vehicles of the future.

DETAILED DESCRIPTION OF THE PREFERRED EMBODIMENT

Figure 1:
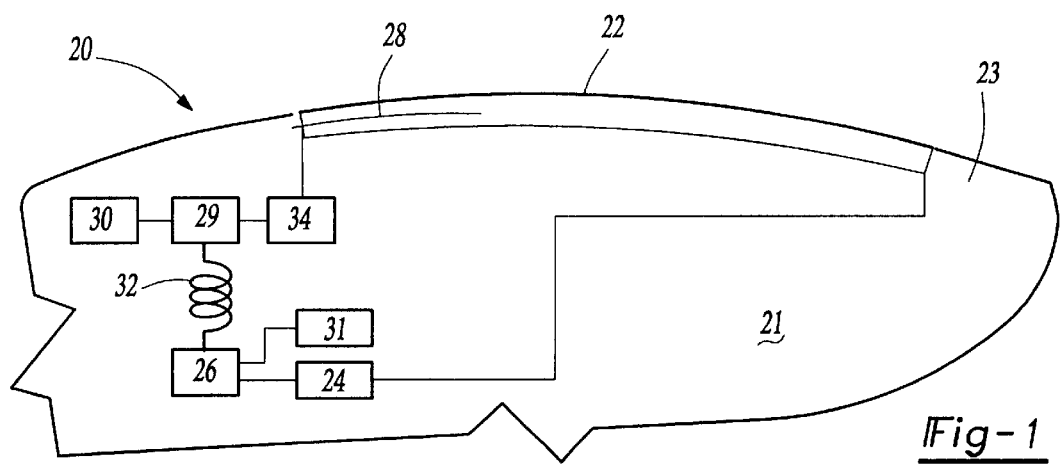
FIG. 1 is a schematic illustration of a system designed according to this invention.

FIG. 1 schematically illustrates a self-powered solar sunroof assembly, generally shown as 20. Preferably, the sunroof assembly 20 is used in a vehicle 21, shown schematically. The sunroof assembly 20 preferably includes a generally rectangular movable panel 22, preferably a window, mounted in the vehicle's roof 23, a motor 24 for controlling movement of the movable window 22, and a self-contained power supply unit that supplies power to the motor 24. The motor 24 drives window 22 with mechanical connections, as known.

The self-contained power supply unit includes at least one auxiliary battery or battery pack 26, separate from the vehicle's battery, and at least one solar cell array 28. The battery 26 is preferably mounted in the roof 23 and adjacent the motor 24. The solar cell array 28 charges the battery 26. The use of solar cells in sunroofs is known. However, a self-contained unit including solar cells and an auxiliary battery where the solar cells are used solely for the purpose of charging a specific battery(s) to power the sunroof is novel An additional component of the sunroof assembly 20 is a charge regulator 29. The charge regulator 29 acts as a sort of two-way road-block that ensures current does not flow from the battery 26 to the solar cell array or arrays 28 when powder is not being generated and the regulator keeps the battery 26 from being overcharged by the solar cell array or arrays 28. The charge regulator 29 monitors the charge on the battery 26 and detects when the battery 26 has reached its maximum power. When the battery's 26 maximum power is reached, the charge regulator 29 prevents the solar cell array or arrays 28 from supplying any more power to the battery 26. Additionally, the charge regulator 29 could have a temperature compensation feature. Temperature compensation allows the charge regulator 29 to lower the charge voltage when the system 20 is subject to high temperatures. Finally, the charge regulator 29 and battery 26 must be insulated to protect them from extreme temperatures.

Two optional features of the sunroof assembly are a monitor 30 and a cooling fan 31. The monitor 30 detects and displays the battery's 26 charge and the solar input. Essentially, the monitor 30 shows the vehicle's driver that the solar sunroof system 20 is working. The monitor 30 is not an essential component of the system 20. However, it is easily incorporated into the system by connecting to the charge regulator 29. The cooling fan 31 is engaged to draw air out of the vehicle when the temperature in the vehicle reaches a predetermined value.

The motor 24 is typically designed to run off a 12-volt power source. Therefore, the auxiliary battery 26 preferably supplies 12 volts. Several types of batteries could be used in this system, including, but not limited to, lead based batteries, nickel-cadmium batteries, nickel metal-hydride batteries, lithium batteries, and lithium-ion batteries. In the preferred embodiment of this system 20, there are six Cyclon lead based batteries 26 that are sealed and insulated. The battery pack 26 is sealed to prevent leakage of the battery 26 contents. The battery pack 26 is insulated to increase the batteries' performance since batteries 26 are sensitive to temperature variances. Further, the preferred battery pack 26 supplies twelve (12) volts, thirty (30) amps and has a capacity of 2.5 amp-hours.

Various types of solar cell arrays can be used in this system, including, but not limited to, thin film amorphous silicon cells, single crystalline silicon solar cells, and polycrystalline solar cells. Preferably, each solar cell array 28 is made of at least one, thin film silicon cell. Also, the movable window 22 preferably consists of two layers of glass. The solar cell array 28 is preferably laminated between the two layers of glass. Alternatively, the solar cell array 28 could be attached to the top surface of the movable window 22. In another alternative, the solar cell array 28 could be laminated to the underside of the window and then encapsulated with polyurethane.

Figure 2:
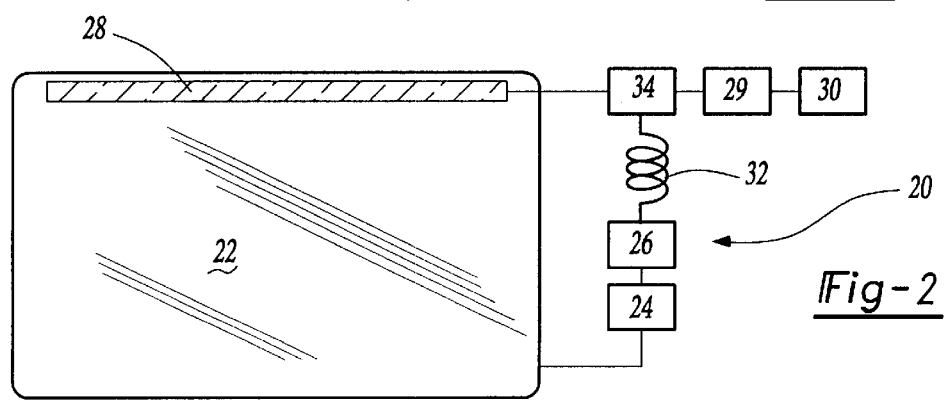
FIG. 2 is a top view of the system of FIG.1.

Another novel feature of this invention is the location of the solar cell array or arrays 28. A minimal number of cells are needed because their only function is to charge the auxiliary battery 26. Therefore, it is easier to conceal the solar cell array or arrays 28. In the preferred embodiment, shown in FIG. 2, there is one single crystalline silicon solar cell array 28 preferably located at the front edge of the movable window 22.

Figure 3:
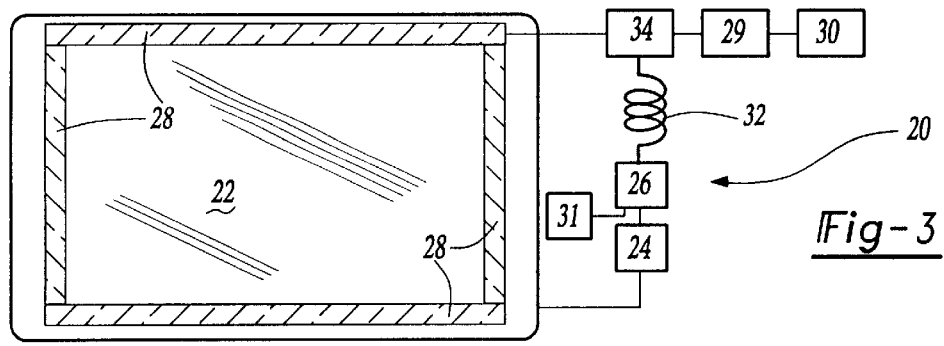
FIG. 3 is a top view of an alternative embodiment of the system of FIG. 1.

As shown in FIG. 3, four single crystalline silicon solar cell arrays 28 could be placed around the entire periphery of the moveable window 22. This would generate additional electricity that could be used to power other accessories or to recharge the vehicle's main battery.

Figure 4:
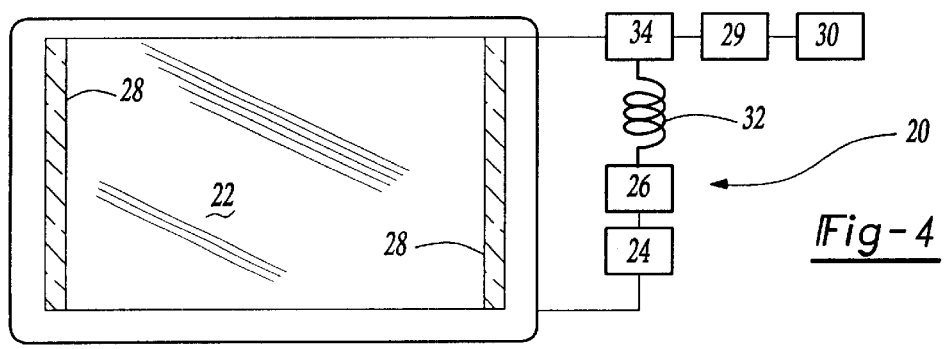
FIG. 4 is a top view of an alternative embodiment of the system of FIG. 1.

In an alternative embodiment, shown in FIG. 4, thin film amorphous silicon solar cell arrays 28 are used. Preferably, two arrays are used. Further, each cell array 28 would be placed along one edge of the moveable window 22 positioned parallel to each other. Placement of the solar cell array or arrays 28 in any of the above listed configurations allows for maximum visibility through the movable window 22.

Another consideration in the design of this sunroof assembly 20 is the wiring that facilitates transporting the power from the solar cell array or arrays to the battery or batteries. Several configurations are possible, including, but not limited to, using the sunroof rails as terminals, adding a conducting strip mechanism along the top of the rails, an overlapping ribbon wire mechanism, a recoil mechanism with a moveable terminal, or a stretch-cord mechanism. The most preferable configuration is the stretch-cord mechanism 32. Preferably, when the moveable window 22 is closed, the stretch-cord mechanism 32 is completely compressed. On the other hand, as the moveable window 22 opens, the stretched cord mechanism 32 stretches out.

A terminal board 34 is also an optional feature of the sunroof assembly 20. The terminal board 34 incorporates the charge regulator 29. The terminal board 34 is physically located between the solar cell array or arrays 28 and the battery unit 26. The terminal board 34 allows for easy disconnection of the components connected to it.

This sunroof assembly 20 can be used on a spoiler sunroof, a slide-tilt sunroof, or other types of sunroofs. The movable window in a spoiler sunroof remains outside of the vehicle at all times. On the other hand, the movable window in a slide-tilt sunroof slides between the roof skin and the headliner. The sunroof assembly 20 is designed to provide power to cycle the unit a minimum of sixty (60) times before the battery 26 becomes completely discharged.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A self-powered sunroof assembly for use in a vehicles roof, comprising:
   a movable window;
   a motor for controlling movement of said movable window;
   a self-contained power supply unit that supplies power to said motor and including at least one auxiliary battery and at least one solar cell array, said at least one solar cell array charging said at least one auxiliary battery; and
   a monitor that detects activity of said at least one solar cell array and said at least one auxiliary battery and said monitor displays activity of said at least one solar cell array and said at least one auxiliary battery.

2. A sunroof assembly as set forth in claim 1, further comprising a charge regulator, wherein said regulator monitors the charge on said at least one battery and detects when said at least one battery has reached a maximum desired power, when said at least one battery has reached said maximum desired power said regulator prevents said at least one solar cell array from supplying any more power to said at least one battery and said charge regulator prevents current flow from said at least one battery to said at least one solar cell array.

3. A sunroof assembly as set forth in claim 1, wherein said self-contained power supply unit comprises a plurality of batteries.

4. A sunroof assembly a set forth in claim 1, wherein said sunroof assembly is a spoiler sunroof.

5. A sunroof assembly as set forth in claim 1, wherein said sunroof assembly is a slide-tilt sunroof.

6. A sunroof assembly as set forth in claim 1, wherein said at least one solar cell array is made of at least one, thin film amorphous silicon cell.

7. A sunroof assembly as set forth in claim 6, wherein said window is comprised of two layers of glass, said at least one solar cell array being laminated between said two layers of glass.

8. A self-powered sunroof assembly for use in a vehicle's roof, comprising:
   a movable window,
   a motor for controlling movement of said movable window;
   a self-contained power supply unit that supplies power to said motor and including at least one auxiliary battery and at least one solar cell array, said at least one solar cell array charging said at least one auxiliary battery and wherein said at least one solar cell array is disposed at one edge of said panel; and a monitor that detects activity of said at least one solar cell array and said at least one auxiliary battery and said monitor displays activity of said at least one solar cell array and said at least one auxiliary battery.

9. A sunroof assembly as set forth in claim 8, wherein said moveable window is generally rectangular and said at least one solar cell array includes up to four solar cell arrays with each of said solar cell arrays being positioned along one edge of said rectangular moveable window.

10. A sunroof assembly as set forth in claim 8, wherein said at least one solar cell array is laminated to an underside of said window and encapsulated with polyurethane.

11. A sunroof assembly as set forth in claim 8, wherein at least one solar cell array is made of at least one, single crystalline silicon solar cell array.

12. A sunroof assembly as set forth in claim 8, wherein a central area of said window is uncovered by said solar cell array.

13. A sunroof assembly as set forth in claim 12, wherein said at least one solar cell array includes two solar cell arrays placed parallel to each other along opposite edges of said moveable window.

14. A self-powered sunroof assembly that can be mounted in a roof of a vehicle comprising:

a movable window;

a motor for controlling movement of said movable window;

an independent battery unit that supplies power to said motor;

at least one solar cell array attached to said sunroof assembly, said at least one solar cell array charging said independent battery unit;

a charge regulator that monitors the charge on said battery unit and detects when said battery unit has reached its maximum power, when said battery unit has reached its maximum power said regulator prevents said at least one solar cell array from supplying any more power to said battery unit, and said charge regulator prevents current flow from said at least one battery to said at least one solar cell array; and a monitor that displays information relative to- said at least one solar cell array and said battery unit.

15. A sunroof assembly as set forth in claim 14, further comprising a terminal board that allows for connection and disconnection of said sunroof assembly components, and a cooling fan to draw air out of the vehicle when the temperature in the vehicle reaches a predetermined value.

16. A sunroof assembly as set forth in claim 15, wherein a central area of said window is uncovered by said solar cell array.

17. A sunroof assembly as set forth in claim 16, wherein said at least one solar cell array includes two solar cell arrays placed parallel to each other along opposite sides of said moveable window.

18. A sunroof assembly as set forth in claim 16, wherein said at least one solar cell array is only disposed at one edge of said window.

19. A self-powered sunroof assembly for use in a vehicle's roof, comprising:

a movable window panel mounted within a vehicle roof;

a motor mounted within said roof adjacent to said window panel to control movement of said window panel;

a self-contained power supply unit solely installed within said roof to power said motor and including at least one auxiliary battery and at least one solar cell array, said at least one solar cell array charging said at least one auxiliary battery and wherein said at cast one solar cell array is disposed at one edge of said window panel.

20. A sunroof assembly as set forth in claim 19, including a charge regulator mounted within said roof that monitors the charge on said battery unit and detects when said battery unit has reached its maximum power.

21. A sunroof assembly as set forth in claim 20 wherein said change regulator includes a temperature compensator enabling said charge regulator to lower charge voltage as a function of system temperature.

22. A sunroof assembly as set forth in 20 wherein said window panel is generally rectangular and said at least one solar cell array includes up to four solar cell arrays with each of said solar cell arrays being positioned along one edge of said rectangular window panel.

23. A sunroof assembly as set forth in claim 20 wherein a central area of said window panel is uncovered by said solar cell array.

24. A sunroof assembly as set forth in claim 20 including a cooling fan mounted within said roof to draw air out of the vehicle when vehicle temperature reaches a predetermined value.

25. A sunroof assembly as set forth in claim 24 including a monitor to detect and display the charge level of said auxiliary battery.

26. A sunroof assembly as set forth in claim 25 wherein said monitor detects and displays solar input to said at least one solar cell array.

* * * * *